(12) United States Patent
Kazama et al.

(10) Patent No.: US 10,767,678 B2
(45) Date of Patent: Sep. 8, 2020

(54) FASTENING MEMBER AND ROD-SHAPED MEMBER FOR FASTENING MEMBER

(71) Applicant: NHK Spring Co., Ltd., Yokohama-shi (JP)

(72) Inventors: Toshio Kazama, Yokohama (JP); Noriyoshi Kaneda, Yokohama (JP); Shun Hirai, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 311 days.

(21) Appl. No.: 15/752,401

(22) PCT Filed: Aug. 26, 2016

(86) PCT No.: PCT/JP2016/075097
§ 371 (c)(1),
(2) Date: Feb. 13, 2018

(87) PCT Pub. No.: WO2017/038726
PCT Pub. Date: Mar. 9, 2017

(65) Prior Publication Data
US 2019/0003507 A1    Jan. 3, 2019

(30) Foreign Application Priority Data

Aug. 28, 2015 (JP) .................. 2015-169599

(51) Int. Cl.
*F16B 33/06* (2006.01)
*F16B 19/06* (2006.01)
(Continued)

(52) U.S. Cl.
CPC .............. *F16B 19/06* (2013.01); *C22C 21/10* (2013.01); *C22C 21/16* (2013.01); *F16B 33/06* (2013.01);
(Continued)

(58) Field of Classification Search
CPC ........ F16B 33/06; F16B 33/008; F16B 37/00; F16B 35/00
(Continued)

(56) References Cited

U.S. PATENT DOCUMENTS 4,620,886 A    11/1986    Wincierz et al.
4,695,213 A    9/1987    Spading et al.
(Continued)

FOREIGN PATENT DOCUMENTS

CN    101382163 A    3/2009
CN    102925770 B    7/2014
(Continued)

OTHER PUBLICATIONS

Isao Iwayama et al, "6056 Aluminum Alloy Wire for Automotive Fasteners" Automotive, SEI Technical Review, No. 77, Oct. 2013, pp. 74-78. (cited in Feb. 18, 2019 Search Report issued for EP16841758.2).

(Continued)

*Primary Examiner* — Flemming Saether
(74) *Attorney, Agent, or Firm* — Locke Lord LLP (57) ABSTRACT

A fastening member includes: a first alloy section made of aluminum alloy containing zinc in an amount of 0.005 wt % or more and 6.5 wt % or less and containing magnesium in an amount of 0.6 wt % or more and 2.0 wt % or less, and provided at a portion being in contact with at least one of the plurality of members; and a second alloy section made of an aluminum alloy containing magnesium in an amount of greater than 0.2 wt % and 2.3 wt % or less and containing copper in an amount of greater than 1.0 wt % and 8.0 wt % or less, and bonded to the first alloy section.

10 Claims, 5 Drawing Sheets

(51) Int. Cl.
    *F16B 37/00*     (2006.01)
    *F16B 35/04*     (2006.01)
    *C22C 21/10*     (2006.01)
    *C22C 21/16*     (2006.01)
    *F16B 33/02*     (2006.01)
    *F16B 37/14*     (2006.01)

(52) U.S. Cl.
CPC ............ *F16B 35/04* (2013.01); *F16B 35/048* (2013.01); *F16B 37/00* (2013.01); *F16B 37/005* (2013.01); *F16B 33/02* (2013.01); *F16B 37/14* (2013.01)

(58) Field of Classification Search
USPC ................................. 411/424, 427, 378, 914
See application file for complete search history.

(56) References Cited

U.S. PATENT DOCUMENTS

| | | | |
|---|---|---|---|
| 4,817,264 A | | 4/1989 | Worthing |
| 5,522,950 A | * | 6/1996 | Bartges ................. C22C 21/003 148/550 |
| 5,759,302 A | * | 6/1998 | Nakai ..................... C22C 21/12 148/415 |
| 5,853,806 A | * | 12/1998 | Higuchi .................... C23C 2/02 427/310 |
| 8,828,314 B2 | * | 9/2014 | Feng ........................ C22C 1/026 420/540 |
| 8,852,364 B2 | * | 10/2014 | Gejima ................... C22C 21/02 148/418 |
| 9,045,815 B2 | * | 6/2015 | Lee ........................ C22C 21/00 |
| 9,200,664 B2 | * | 12/2015 | Bae ........................ F16B 37/14 |
| 10,294,977 B2 | * | 5/2019 | Kazama .................. C22C 21/10 |
| 2004/0240963 A1 | | 12/2004 | Luhm |
| 2007/0110544 A1 | * | 5/2007 | Friederich ............... F16B 25/00 411/387.4 |
| 2009/0060678 A1 | | 3/2009 | Felder et al. |
| 2012/0070248 A1 | | 3/2012 | Kuwabara et al. |
| 2012/0156089 A1 | | 6/2012 | Gejima |
| 2014/0126978 A1 | * | 5/2014 | Auriol ...................... B21J 15/02 411/501 |
| 2015/0362006 A1 | | 12/2015 | Kuwabara et al. |
| 2019/0203326 A1 | * | 7/2019 | Wingen .................. C22F 1/057 |

FOREIGN PATENT DOCUMENTS

| | | |
|---|---|---|
| EP | 3121464 A1 | 1/2017 |
| JP | S51-141642 A | 12/1976 |
| JP | 2008-106848 A | 5/2008 |
| JP | 2008-144266 A | 6/2008 |
| JP | 2011-006778 A | 1/2011 |
| JP | 2011-190493 A | 9/2011 |
| JP | 4925971 B2 | 5/2012 |
| JP | 5335056 B2 | 11/2013 |
| JP | 2015-034622 A | 2/2015 |
| WO | 2010/137494 A1 | 12/2010 |

OTHER PUBLICATIONS

"Joint Design", Machine Design, Penton Media, Cleveland, OH, US, vol. 63, No. 13, Jun. 1, 1991, pp. 1013-1020. (cited in Feb. 18, 2019 Search Report issued for EP16841758.2).

Extended European Search Report dated Feb. 18, 2019, issued for European application No. 16841758.2.

Official Action dated Dec. 3, 2019, issued in the corresponding Chinese patent application No. 201680049385.8 and English translation thereof.

Office Action dated Mar. 25, 2019, issued for the Chinese patent application No. 201680049385.8 and English translation of bibliographic and search report.

International Search Report dated Sep. 20, 2016, issued for PCT/JP2016/075097.

* cited by examiner

FASTENING MEMBER AND ROD-SHAPED MEMBER FOR FASTENING MEMBER

FIELD

The present invention relates to a fastening member which fastens a plurality of members, and a rod-shaped member for a fastening member used for manufacturing the fastening member.

BACKGROUND

Conventionally, as a measure for achieving improvement in fuel economy of automobiles, weight reduction of various components has been pursued. For example, an aluminum alloy is used instead of cast iron as a material for an engine block, or a magnesium alloy is used instead of steel as a material for an engine cover or an oil pan.

In the case where the components made of the aluminum alloy or magnesium alloy as mentioned above are fastened by a conventional steel bolt, looseness is likely to occur due to a large difference between the linear expansion coefficient of the aluminum alloy or the magnesium alloy and the linear expansion coefficient of the steel, and corrosion due to contact of dissimilar metals is also likely to occur. Therefore, in order to sufficiently secure the reliability of fastening, it is necessary to deepen the screw hole of the component to lengthen the shaft section length of the steel bolt, or thicken the diameter of the steel bolt. However, the length of the shaft section of the steel bolt influences the wall thickness of the component, and meanwhile, the thickness of the steel bolt influences the width of the flange portion providing the screw hole of the component. Thus, the use of the steel bolts for fastening the components made of aluminum alloy or magnesium alloy has been an obstacle in pursuing the weight reduction.

In order to solve such a problem of steel bolts, the movement of adopting an aluminum alloy bolt as a fastening member for fastening the components made of an aluminum alloy or a magnesium alloy has also been expanded (see, for example, Patent Literature 1). In Patent Literature 1, a 6000 series aluminum alloy is disclosed as a material for a bolt which is excellent in workability at the time of manufacturing the bolt and has sufficient strength. Since the aluminum alloy bolts have small difference in linear expansion coefficient with aluminum alloys or magnesium alloys constituting various components and small galvanic corrosion, even if the screw hole of the component is made shallow or the diameter of the bolt is thinned, the reliability of the fastening can be secured, which is suitable for achieving weight reduction.

2000 series aluminum alloy is known as an aluminum alloy having a higher strength than the aforementioned 6000 series aluminum alloy. When using 2000 series aluminum alloy, it is possible to make bolts of higher strength than bolts made of 6000 series aluminum alloy.

CITATION LIST

Patent Literature

Patent Literature 1: JP 5335056 B2

SUMMARY

Technical Problem

However, since 2000 series aluminum alloys are generally inferior to 6000 series aluminum alloys in stress corrosion cracking resistance, it was necessary to improve the stress corrosion cracking resistance when applied as bolts. Under such circumstances, a fastening member made of a material excellent in strength and stress corrosion cracking resistance has been required.

The present invention has been made in view of the above circumstances, and an object thereof is to provide a fastening member excellent in strength and stress corrosion cracking resistance, and a rod-shaped member for a fastening member used for manufacturing the fastening member.

Solution to Problem

To solve the above-described problem and achieve the object, a fastening member according to the present invention fastens members, and includes: a first alloy section made of aluminum alloy containing zinc in an amount of 0.005 wt % or more and 6.5 wt % or less and containing magnesium in an amount of 0.6 wt % or more and 2.0 wt % or less, is the first alloy section being provided in a portion in contact with at least one of the members; and a second alloy section made of an aluminum alloy containing magnesium in an amount of greater than 0.2 wt % and 2.3 wt % or less and containing copper in an amount of greater than 1.0 wt % and 8.0 wt % or less, the second alloy section being bonded to the first alloy section.

In the above-described fastening member according to the present invention, Vickers hardness of the second alloy section is 130 or more.

In the above-described fastening member according to the present invention, a screw thread is formed in a part of a surface of the first alloy section.

In the above-described fastening member according to the present invention, the fastening member is a male screw including: a cylindrical shaft section with the screw thread formed in at least a part of the outer periphery; a head section provided at one end of the shaft section in an axial direction; and a neck section demarcating a boundary between the shaft section and the head section, the first alloy section constitutes at least a surface layer portion of the screw thread, a surface of the neck section and a surface layer portion of a seating surface of the head section, and a thickness of the surface layer portion of the screw thread of the first alloy section in the radial direction is $1/2000$ or more and $1/10$ or less of a maximum outer diameter of the shaft section.

In the above-described fastening member according to the present invention, the fastening member is a female screw with the screw thread formed on an inner surface of a hole formed in a center portion, the second alloy section is located on an outer peripheral side of the first alloy section, and a thickness of the first alloy section in the radial direction is $1/2000$ or more and $1/10$ or less of a maximum outer diameter of the female screw.

In the above-described fastening member according to the present invention, the fastening member is a rivet including: a cylindrical shaft section; a head section provided at one end portion of the shaft section in the axial direction; and a neck section demarcating a boundary between the shaft section and the head section, the first alloy section constitutes at least a surface layer portion of the shaft section, a surface of the neck section and a surface layer portion of a seating surface of the head section, and a thickness of the first alloy section in the radial direction of the shaft section is $1/2000$ or more and $1/10$ or less of an outer diameter of the shaft section.

A rod-shaped member for a fastening member according to the present invention includes: a core section having a cylindrical shape and made of an aluminum alloy containing magnesium in an amount of greater than 0.2 wt % and 2.3 wt % or less and copper containing in an amount of greater than 1.0 wt % and 8.0 wt % or less; and an outer peripheral portion having a hollow cylindrical shape covering a side surface of the core section with no gap, and made of an aluminum alloy containing zinc in an amount of 0.005 wt % or more and 6.5 wt % or less and containing magnesium in an amount of 0.6 wt % or more and 2.0 wt % or less.

In the above-described rod-shaped member for a fastening member according to the present invention, a thickness of the outer peripheral portion in the radial direction is 1/2000 or more and 1/10 or less of a maximum outer diameter of the outer peripheral portion.

A rod-shaped member for a fastening member according to the present invention includes: a core section having a hollow cylindrical shape and made of an aluminum alloy containing zinc in an amount of 0.005 wt % or more and 6.5 wt % or less and containing magnesium in an amount of 0.6 wt % or more and 2.0 wt % or less; and an outer peripheral portion having a hollow cylindrical shape covering a side surface of the core section with no gap, and made of an aluminum alloy containing magnesium in an amount of greater than 0.2 wt % and 2.3 wt % or less and containing copper in an amount of greater than 1.0 wt % and 8.0 wt % or less.

In the above-described rod-shaped member for a fastening member according to the present invention, a thickness of the core section in the radial direction is 1/2000 or more and 1/10 or less of a maximum outer diameter of the outer peripheral portion.

Advantageous Effects of Invention

According to the present invention, it is possible to provide a fastening member excellent in strength and stress corrosion cracking resistance, by utilizing a clad material including a high-strength aluminum alloy and an aluminum alloy having excellent stress corrosion cracking resistance.

DESCRIPTION OF EMBODIMENTS

Hereinafter, a mode for carrying out the present invention (hereinafter referred to as "embodiment") will be described with reference to the accompanying drawings. It should be noted that the drawings are schematic and a relation between the thickness and the width of each portion, the ratio of the thickness of each portion, and the like may be different from the actual ones, and parts with different dimensional relations and ratios may be included in each drawing.

First Embodiment

Figure 1:
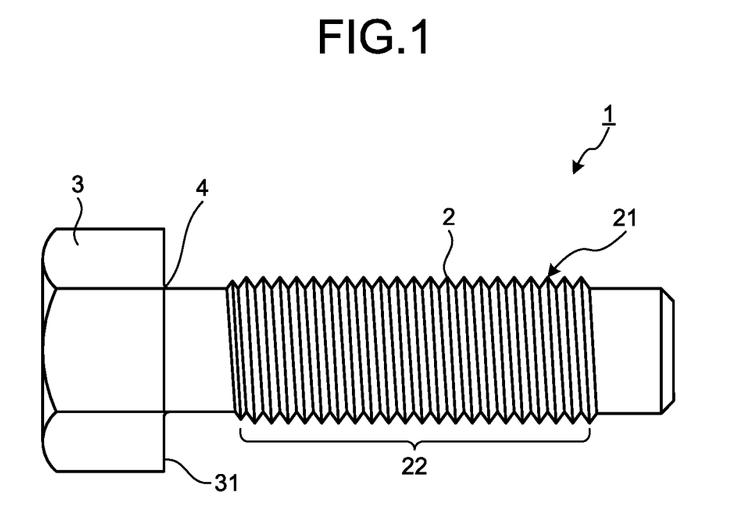
FIG. 1 is a side view illustrating a configuration of a fastening member according to a first embodiment of the present invention.
Figure 2:
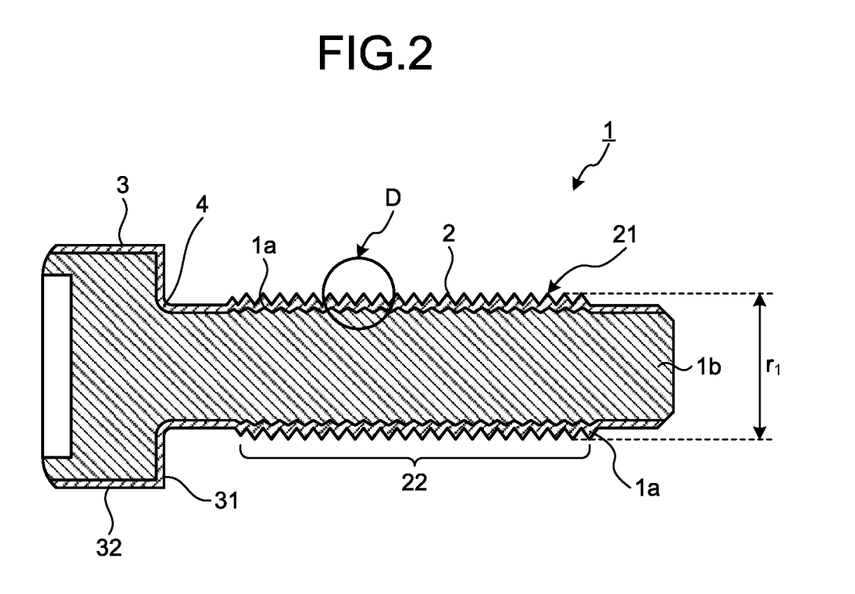
FIG. 2 is a cross-sectional view passing through a center axis of the fastening member illustrated in FIG. 1.

FIG. 1 is a side view illustrating a configuration of a fastening member according to a first embodiment of the present invention. FIG. 2 is a cross-sectional view passing through a central axis of a fastening member illustrated in FIG. 1 in a longitudinal direction (a left-right direction of FIG. 1). A fastening member 1 illustrated in these drawings is a bolt (a kind of male screw) made of a clad material formed by joining two different kinds of aluminum (Al) alloys. The fastening member 1 includes a shaft section 2 having a cylindrical shape, a head section 3 provided at one end of the shaft section 2 in an axial direction (the left-right direction in FIG. 1), and a neck section 4 which demarcates a boundary between the shaft section 2 and the head section 3. The shaft section 2 has a screw section 22 having a screw thread 21 formed on its surface. The shape (hexagonal trim type) of the head section 3 illustrated in FIG. 1 is merely an example, and the head section 3 may have other shapes (a hexagonal flange type, a pan type, a dish type, a truss type, a flat type, etc.).

The fastening member 1 has a first alloy section 1a and a second alloy section 1b respectively formed using two kinds of aluminum alloys different from each other. The first alloy section 1a is provided in a portion being in contact with a member to be fastened. That is, the first alloy section 1a constitutes a surface layer portion of the shaft section 2 including the screw thread 21, the surface of the neck section 4, and a seating surface 31 and the surface layer portion of a side surface 32 of the head section 3. The second alloy section 1b constitutes a radially inner peripheral side of the shaft section 2 and the head section 3, and is joined to the first alloy section 1a. A portion which is not in contact with any of the plurality of members may be configured so that the second alloy section 1b is exposed, in a state in which a plurality of members to be fastened is fastened by the fastening member 1.

The first alloy section 1a is made of an aluminum alloy containing zinc (Zn) in an amount of 0.005 wt % or more and 6.5 wt % or less and containing magnesium (Mg) in an amount of 0.6 wt % or more and 2.0 wt % or less. The aluminum alloy preferably contains at least one kind of element or more selected from the group consisting of copper (Cu), chromium (Cr), zirconium (Zr), iron (Fe), silicon (Si), manganese (Mn), titanium (Ti), vanadium (V), scandium (Sc), nickel (Ni), and bismuth (Bi). As an aluminum alloy having such a composition, for example, A6056 can be adopted. A6056 is an alloy containing Al—Mg—Si as a main element, and is known as an aluminum alloy having relatively high strength and excellent stress corrosion cracking resistance. The thickness of the first alloy section 1a is 10 μm or more and 1.5 mm or less. In particular, the radial thickness of the first alloy section 1a in the shaft section 2 is 1/2000 or more and 1/10 or less of a maximum outer diameter $r_1$ (see FIG. 2) of the shaft section 2.

The second alloy section 1b is made of an aluminum alloy containing magnesium (Mg) in an amount of greater than 0.2 wt % and 2.3 wt % or less and containing copper (Cu) in an amount of greater than 1.0 wt % and 8.0 wt % or less. The aluminum alloy preferably contains at least one kind of element or more selected from the group consisting of zinc (Zn), chromium (Cr), zirconium (Zr), iron (Fe), silicon (Si), manganese (Mn), titanium (Ti), vanadium (V), and scandium (Sc). For example, the aluminum alloy constituting the second alloy section 1b preferably contains zinc (Zn) in an amount of 0.5 wt % or less, manganese in an amount of 1.2 wt % or less, zirconium in an amount of 0.25 wt % or less, and nickel in an amount of 2.5 wt % or less, in addition to the aforementioned magnesium and copper. As an aluminum alloy having such a composition, for example, A2024 and A2618 can be adopted. A2024 and A2618 are known as high-strength aluminum alloys. As a specific strength of the second alloy section 1b, it is desirable that the Vickers hardness be 130 or more.

Figure 3:
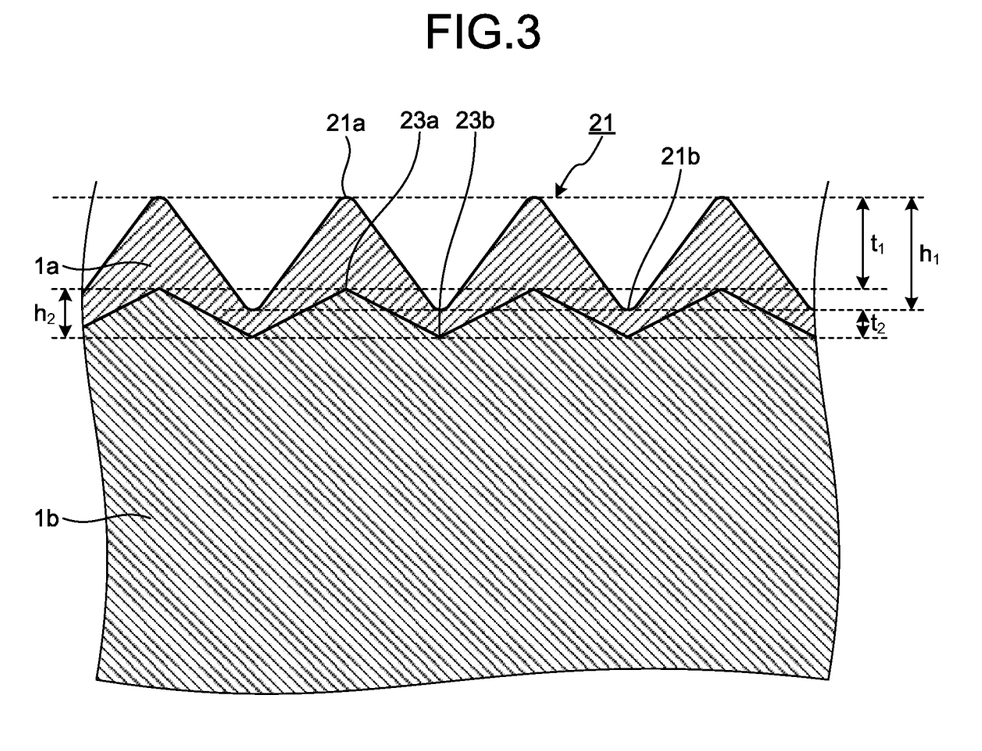
FIG. 3 is an enlarged view of a region D of FIG. 2.

FIG. 3 is an enlarged view of a region D of FIG. 2. As illustrated in FIG. 3, the thickness of the surface layer portion of the screw thread 21 of the screw section 22 of the first alloy section 1a in the radial direction is not necessarily uniform, and a thickness $t_1$ of an apex 21a is greater than a thickness $t_2$ of a valley 21b ($t_1 > t_2$). The thickness $t_2$ is, for example, 10 μm or more and 100 μm or less. The thickness of the surface layer portion of the screw thread 21 in the radial direction is included in the range of 1/2000 or more and 1/10 or less of the maximum outer diameter $r_1$ of the shaft section 2. As a result, all the portions of the screw section 22 which are at least in contact with the members to be fastened become aluminum alloys having excellent stress corrosion cracking resistance.

Further, when the height of the apex 21a of the screw section 22 in the first alloy section 1a is set as $h_1$, and the height of an apex 23a of the screw section 22 in the second alloy section 1b is set as $h_2$, the height $h_2$ of the apex 23a is preferably $h_1/4$ or more and $3h_1/4$ or less. Here, the height $h_1$ corresponds to the distance in the radial direction from the apex 21a to the valley 21b. Further, the height $h_2$ corresponds to the distance in the radial direction from the apex 23a to a valley 23b of the screw section 22 in the second alloy section 1b.

Figure 4:
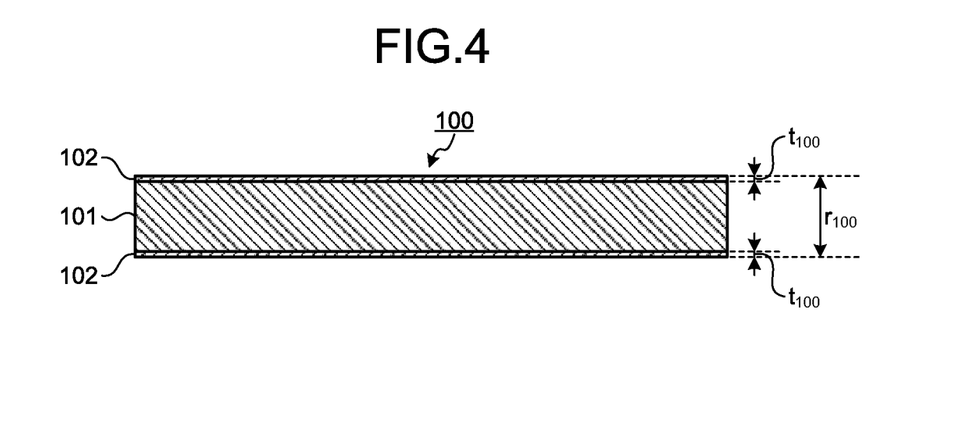
FIG. 4 is a cross-sectional view illustrating a configuration of a rod-shaped member for a fastening member according to a first embodiment of the present invention.

FIG. 4 is a cross-sectional view illustrating the configuration of the rod-shaped member for a fastening member which is a raw material of the fastening member 1. The rod-shaped member 100 for the fastening member (hereinafter simply referred to as "rod-shaped member 100") illustrated in FIG. 4 has a cylindrical shape of two-layer structure which includes a cylindrical core section 101 made of the same aluminum alloy as that of the second alloy section 1b, and an outer peripheral portion 102 which covers the outer periphery of the core section 101 and is made of the same aluminum alloy as that of the first alloy section 1a. A thickness $t_{100}$ of the outer peripheral portion 102 is 1/2000 or more and 1/10 or less ($r_{100}/2000 \leq t_{100} \leq r_{100}/10$) of the diameter $r_{100}$ of the rod-shaped member 100. The fastening member 1 is formed by performing a wire drawing, a header process, or the like on the rod-shaped member 100. In order to enable such molding, it is desirable that a breakage elongation at room temperature (about 1 to 35° C.) of the aluminum alloy constituting the core section 101 converted into the second alloy section 1b after molding be 8% or more.

When the fastening member 1 is formed by performing the wire drawing and the header process on the rod-shaped member 100, a fiber flow in which the metal crystals are elongated in a fiber shape along the screw surface shape can be seen in the screw section 22. If a crack occurs in the screw section 22, a crack propagates across the fiber flow. Therefore, due to the presence of fiber flow, stress corrosion cracking can be suppressed.

According to the aforementioned first embodiment of the present invention, by providing a two-layer structure which includes a first alloy section made of an aluminum alloy having excellent stress corrosion cracking resistance in a portion coming into contact with a member to be fastened, and a second alloy section made of an aluminum alloy of high strength in another portion, it is possible to provide a fastening member having excellent strength and stress corrosion cracking resistance.

Further, according to the first embodiment, since the screw threads are formed in a part of the surface of the first alloy section, it is possible to improve the stress corrosion cracking resistance at the contact portion with the member to be fastened.

Further, according to the first embodiment, the outer peripheral side including the screw thread constitutes a male screw which is the first alloy section, and the thickness of the surface layer portion of the screw thread of the male screw in the radial direction is 1/2000 or more and 1/10 or less of the outer diameter of the screw section. Accordingly, it is possible to achieve both strength and stress corrosion cracking resistance at an appropriate balance.

Further, according to the first embodiment, by forming a rod-shaped member for a fastening member which is a clad member which includes the outer peripheral portion having a hollow cylindrical shape and made of an aluminum alloy excellent in stress corrosion cracking resistance provided in the portion being in contact with the member to be fastened, and the core section having a cylindrical shape covered with the outer peripheral portion with no gap and made of a high-strength aluminum alloy, it is possible to form a fastening member (a male screw) with excellent strength and stress corrosion cracking resistance by the same manufacturing method as the relate art.

Further, according to the first embodiment, since the thickness of the outer peripheral portion of the rod-shaped member for the fastening member in the radial direction is 1/2000 or more and 1/10 or less of the diameter of the rod-shaped member for the fastening member, it is possible to achieve both strength and stress corrosion cracking resistance at an appropriate balance in the fastening member (male screw) after molding.

Second Embodiment

Figure 5:
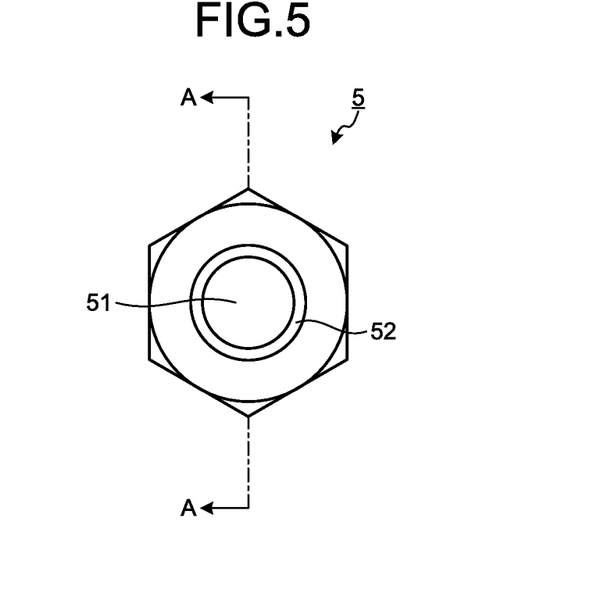
FIG. 5 is a plan view illustrating a configuration of a fastening member according to a second embodiment of the present invention.
Figure 6:
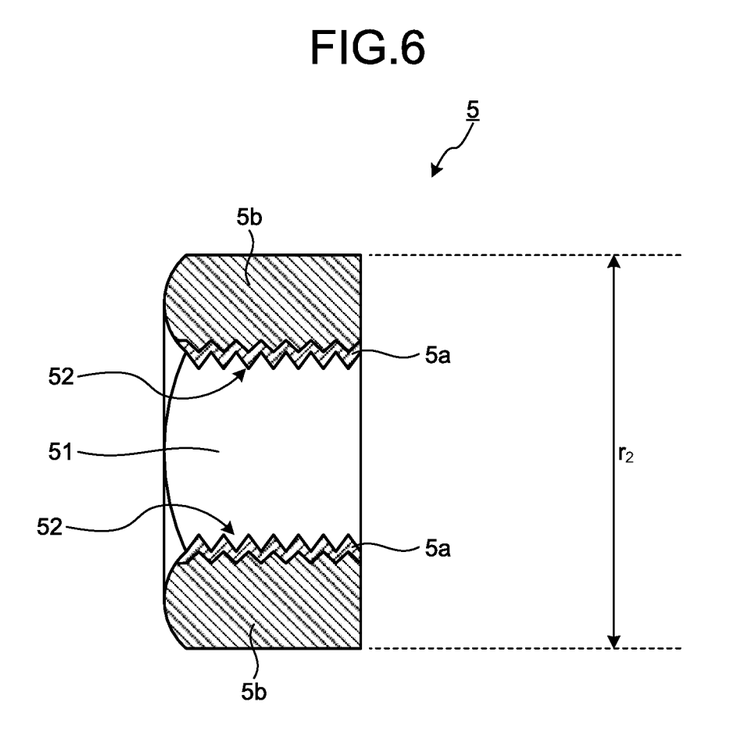
FIG. 6 is a cross-sectional view taken along line A-A of FIG. 5.

FIG. 5 is a plan view illustrating a configuration of a fastening member according to the second embodiment of the present invention. FIG. 6 is a cross-sectional view taken along line A-A of FIG. 5. A fastening member 5 illustrated in these drawings is a nut (a kind of female screw) made of a clad material formed by joining two kinds of aluminum alloys different from each other. The fastening member 5 has a hollow cylindrical shape, and a screw thread 52 is formed on the inner surface of a hole 51 formed at the center portion. The shape (a hexagonal nut) of the fastening member 5 illustrated in FIG. 5 is merely an example, and the high strength aluminum alloy can be achieved as a nut (a flanged nut, a cap nut, a high nut, or the like) having another shape.

The fastening member 5 includes a first alloy section 5a and a second alloy section 5b which are respectively formed, using two different types of aluminum alloys. The first alloy section 5a has a ring shape constituting a surface layer portion of the screw thread 52 which is a portion coming into contact with a member to be fastened. The second alloy section 5b has a ring shape which covers the outer peripheral surface of the first alloy section 5a.

The first alloy section 5a is made of the same aluminum alloy as the first alloy section 1a of the first embodiment, and the second alloy section 5b is made of the same aluminum alloy as the second alloy section 1b of the first embodiment. The first alloy section 5a is the same as the first alloy section 1a in that the thickness of the first alloy section 5a is 10 μm or more and 1.5 mm or less. The thickness of the first alloy section 5a in the radial direction is 1/2000 or more and 1/10 or less of the maximum outer diameter (circle equivalent outer diameter) $r_2$ (see FIG. 6) of the fastening member 5. Further, the second alloy section 5b is the same as the second alloy section 1b in that the Vickers hardness of the second alloy section 5b is 130 or more and that the breakage elongation at room temperature of the second alloy section 5b is 8% or more.

The thickness of the surface layer portion of the screw thread 52 of the first alloy section 5a in the radial direction is not necessarily uniform, and is included in the range of 1/2000 or more and 1/10 or less of the maximum outer diameter (circle equivalent outer diameter) $r_2$ of the fastening member 5. As a result, at least the entire screw threads 52, which are portions coming in contact with the member to be fastened, become aluminum alloys having excellent stress corrosion cracking resistance.

Figure 7:
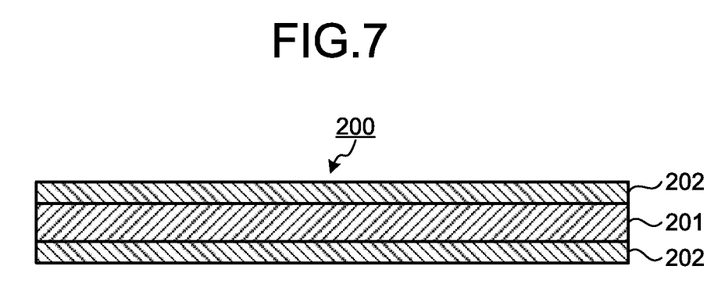
FIG. 7 is a cross-sectional view illustrating a configuration of a rod-shaped member for a fastening member according to the second embodiment of the present invention.

FIG. 7 is a cross-sectional view illustrating a configuration of a rod-shaped member for a fastening member which is a raw material of the fastening member 5. A rod-shaped member 200 for the fastening member (hereinafter simply referred to as "rod-shaped member 200") illustrated in FIG. 7 is a cylindrical clad material of a two-layer structure which includes a cylindrical core section 201 made of the same aluminum alloy as the first alloy section 5a, and an outer peripheral portion 202 which covers the outer periphery of the core section 201 with no gap and is made of the same aluminum alloy as the second alloy section 5b. The fastening member 5 is formed by performing the wire drawing on the rod-shaped member 200, the digging process of the core section 201, the header process, and the like. In order to enable such molding, it is desirable that the breakage elongation at room temperature of the aluminum alloy constituting the outer peripheral portion 202 to be the second alloy section 5b after molding be 8% or more.

Figure 8:
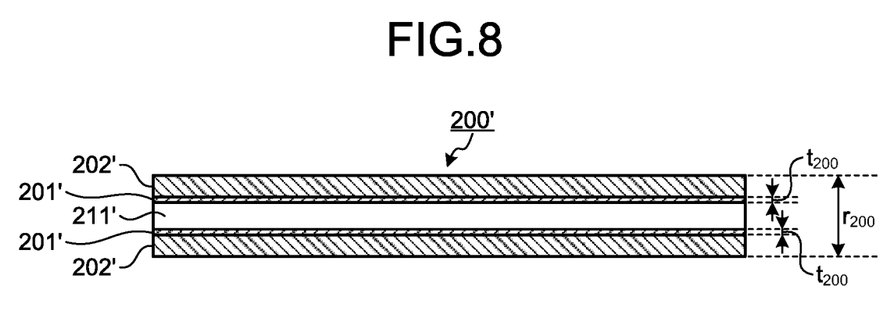
FIG. 8 is a cross-sectional view illustrating a configuration after performing a digging process on the rod-shaped member for the fastening member according to the second embodiment of the present invention.

FIG. 8 is a cross-sectional view illustrating a configuration after performing the digging process of the core section 201 with respect to the rod-shaped member 200. A rod-shaped member 200' illustrated in FIG. 8 includes a hollow cylindrical core section 201', and an outer peripheral portion 202' which covers the side surface of the core section 201' with no gap. Among them, a thickness $t_{200}$ of the core section 201' in the radial direction is 1/2000 or more and 1/10 or less ($r_{200}/2000 \leq t_{200} \leq r_{200}/10$) of a diameter $r_{200}$ of the rod-shaped member 200'. In the second embodiment, after the wire drawing is performed on the rod-shaped member 200, a rod-shaped member 200' having a core section 201' in which a hole 211' is formed by performing the digging process is obtained. Thereafter, by performing the header process or the like on the rod-shaped member 200', the fastening member 5 is formed. Further, the wire drawing may be performed after performing the digging process on the rod-shaped member 200. Further, after the wire drawing is performed on the rod-shaped member 200, the rod-shaped member 200 is cut to a length necessary for forming the fastening member 5 (nut), and then the digging process may be performed.

According to the aforementioned second embodiment of the present invention, by providing a two-layer structure which includes the first alloy section made of an aluminum alloy excellent in stress corrosion cracking resistance in the portion coming into contact with the member to be fastened, and the second alloy section made of an aluminum alloy having excellent strength at the outer peripheral side of the first alloy section, it is possible to provide the fastening member having excellent strength and stress corrosion cracking resistance as in the first embodiment.

Further, according to the second embodiment, since the screw threads are formed on a part of the surface of the first alloy section, it is possible to improve the stress corrosion cracking resistance at the contact portion with the member to be fastened.

Further, according to the second embodiment, the inner peripheral side constitutes the female screw which is the first alloy section, and the thickness of the first alloy section in the radial direction is 1/2000 or more and 1/10 or less of the maximum outer diameter of the female screw. Accordingly, it is possible to achieve both strength and stress corrosion cracking resistance at an appropriate balance.

Further, according to the second embodiment, by forming a rod-shaped member for a fastening member which includes the core section having a hollow cylindrical shape and made of an aluminum alloy excellent in stress corrosion cracking resistance in the portion being in contact with the member to be fastened, and the outer peripheral portion which has a cylindrical shape to cover the outer periphery of the deep part and is made of a high-strength aluminum alloy, and in which the thickness of the core section in the radial direction is 1/2000 or more and 1/10 or less of the maximum outer diameter of the outer peripheral portion, it is possible to form a fastening member (nut) in which both strength and stress corrosion cracking resistance are achieved at an appropriate balance by the same manufacturing method as the related art.

Third Embodiment

Figure 9:
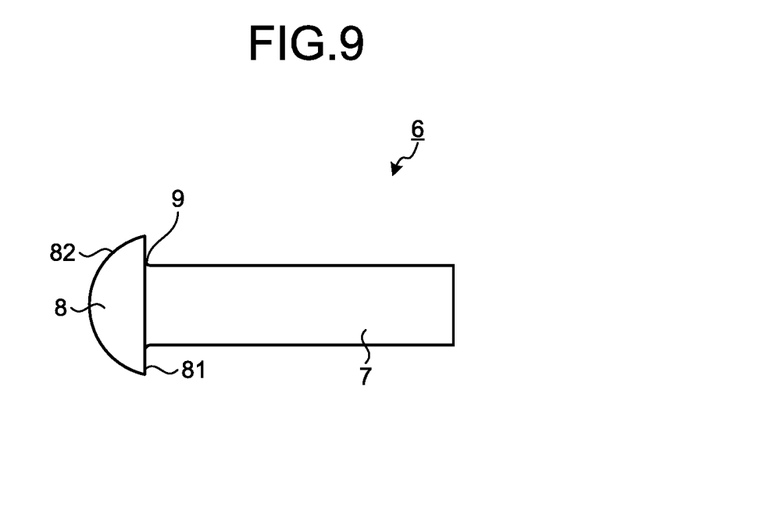
FIG. 9 is a side view illustrating a configuration of a fastening member according to a third embodiment of the present invention.
Figure 10:
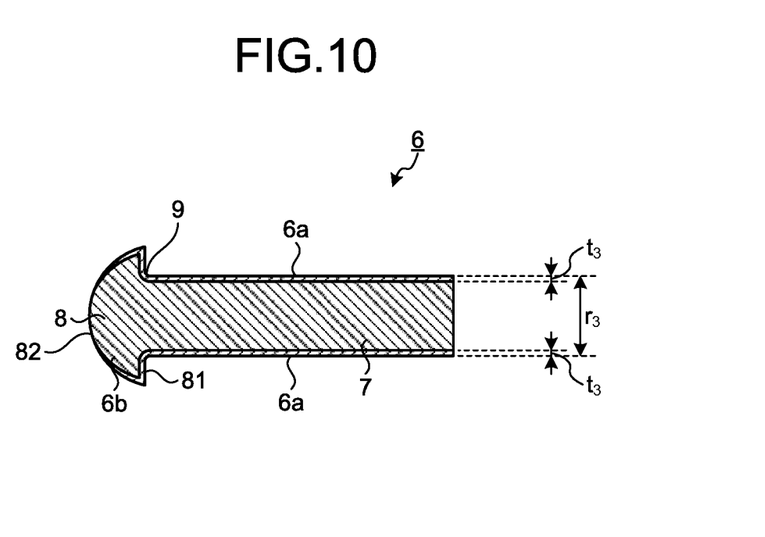
FIG. 10 is a cross-sectional view passing through the center axis of the fastening member illustrated in FIG. 9.

FIG. 9 is a side view illustrating a configuration of a fastening member according to a third embodiment of the present invention. FIG. 10 is a cross-sectional view passing through the central axis of the fastening member illustrated in FIG. 9 in the longitudinal direction (left-right direction in FIG. 9). A fastening member 6 illustrated in these drawings is a rivet made of a clad material formed by joining two kinds of aluminum alloys different from each other. The fastening member 6 includes a cylindrical shaft section 7, a head section 8 provided at one end of a cylinder forming the shaft section 7 in the height direction (left-right direction in FIG. 9), and a neck section 9 demarcating a boundary between the shaft section 7 and the head section 8. It should be noted that the shape (round shape) of the head section 8 illustrated in FIG. 9 is merely an example, and other shapes (a dish shape or the like) may be provided.

The fastening member 6 includes a first alloy section 6a and a second alloy section 6b which are respectively formed, using two different types of aluminum alloys. The first alloy section 6a is provided at a portion which is in contact with a member to be fastened. In other words, the first alloy section 6a forms the surface layer portion of the shaft section 7, the surface of the neck section 9, the surface layer portion of a seating surface 81 of the head section 8, and at least a part of the surface layer portion of the region continued to the seating surface 81 of a surface 82 of the head section 8. The second alloy section 6b constitutes a portion other than the inner peripheral side of the shaft section 7 and the first alloy section 6a of the head section 8.

The first alloy section 6a is made of the same aluminum alloy as the first alloy section 1a of the first embodiment, and the second alloy section 6b is made of the same aluminum alloy as the second alloy section 1b of the first embodiment. The first alloy section 6a is the same as the first alloy section 1a in that the thickness of the first alloy section 6a is 10 μm or more and 1.5 mm or less. Further, a thickness $t_3$ in the radial direction of the first alloy section 6a in the shaft section 7 is $1/2000$ or more and $1/10$ or less of the outer diameter $r_3$ (see FIG. 10) of the shaft section 7. Furthermore, the second alloy section 6b is the same as the second alloy section 1b in that the Vickers hardness of the second alloy section 6b is 130 or more, and the breakage elongation at room temperature of the second alloy section 6b is 8% or more.

The thickness $t_3$ of the first alloy section 6a in the shaft section 7 is $1/2000$ or more and $1/10$ or less ($r_3/2000 \leq t_3 \leq r_3/10$) of the outer diameter $r_3$ of the shaft section 7. Such a fastening member 6 can be formed by performing the wire drawing, the header process, or the like on the rod-shaped member 100 illustrated in FIG. 4.

According to the aforementioned third embodiment of the present invention, by adopting a two-layer structure in which the first alloy section made of an aluminum alloy having excellent stress corrosion cracking resistance is provided in the portion being in contact with the member to be fastened, and the second alloy section made of an aluminum alloy having excellent strength is provided in other portions, it is possible to provide a fastening member with excellent strength and stress corrosion cracking resistance as in the first embodiment.

According to the third embodiment, since the rivet in which the outer peripheral side is the first alloy section is formed, and the thickness of the first alloy section in the shaft section of the rivet in the radial direction is $1/2000$ or more and $1/10$ or less of the outer diameter of the shaft section, it is possible to achieve both strength and stress corrosion cracking resistance at an appropriate balance.

Further, according to the third embodiment, by forming a rod-shaped member for a fastening member which is a clad material which includes an outer peripheral portion having a hollow cylindrical shape and made of an aluminum alloy with excellent stress corrosion cracking resistance in a portion being in contact with the member to be fastened, and a core section having a cylindrical shape covered with the outer peripheral portion with no gap and made of a high-strength aluminum alloy, it is possible to form a fastening member (rivet) having excellent strength and stress corrosion cracking resistance by the same manufacturing method as the related art.

Further, according to the third embodiment, since the thickness of the outer peripheral portion of the rod-shaped member for the fastening member in the radial direction is $1/2000$ or more and $1/10$ or less of the diameter of the rod-shaped member for the fastening member, it is possible to achieve both strength and stress corrosion cracking resistance at an appropriate balance in the fastening member (rivet) after the molding.

Although the mode for carrying out the present invention has been described here, the present invention should not be limited only by the above described first to third embodiments. For example, it is also possible to achieve the fastening member according to the present invention as a small screw or a tapping screw which is a male screw other than a bolt.

Further, in the present invention, it is also possible to provide a layer made of an aluminum alloy having excellent stress corrosion cracking resistance on the surface of the first alloy section. As such an aluminum alloy, for example, an aluminum alloy of 3000 series, 4000 series, 5000 series, 6000 series, and 7000 series can be adopted.

As described above, the present invention can include various embodiments and the like which are not described here, and various design changes and the like can be made within the scope that does not depart from the technical idea specified by the claims.

INDUSTRIAL APPLICABILITY

As described above, the fastening member according to the present invention, and the rod-shaped member for the fastening member used for manufacturing the fastening member are suitable for obtaining a fastening member with excellent strength and stress corrosion cracking resistance.

REFERENCE SIGNS LIST 1, 5, 6 Fastening member
1a, 5a, 6a First alloy section
1b, 5b, 6b Second alloy section
2, 7 Shaft section
3, 8 Head section
4, 9 Neck section
21, 52 Screw thread
21a Apex
21b Valley
22 Screw section
31, 81 Seating surface
32 Side surface
51, 211' Hole
82 Surface
100, 200, 200' Rod-shaped member for fastening member
101, 201, 201' Core section
102, 202, 202' Outer peripheral portion

The invention claimed is:

1. A fastening member that fastens members, the fastening member comprising:
   a first alloy section made of aluminum alloy containing zinc in an amount of 0.005 wt % or more and 6.5 wt % or less and containing magnesium in an amount of 0.6 wt % or more and 2.0 wt % or less, is the first alloy section being provided in a portion in contact with at least one of the members; and
   a second alloy section made of an aluminum alloy containing magnesium in an amount of greater than 0.2 wt % and 2.3 wt % or less and containing copper in an amount of greater than 1.0 wt % and 8.0 wt % or less, the second alloy section being bonded to the first alloy section.

2. The fastening member according to claim 1, wherein Vickers hardness of the second alloy section is 130 or more.

3. The fastening member according to claim 1, wherein a screw thread is formed in a part of a surface of the first alloy section.

4. The fastening member according to claim 3, wherein the fastening member is a male screw including:
- a cylindrical shaft section with the screw thread formed in at least a part of the outer periphery;
- a head section provided at one end of the shaft section in an axial direction; and
- a neck section demarcating a boundary between the shaft section and the head section, the first alloy section constitutes at least a surface layer portion of the screw thread, a surface of the neck section and a surface layer portion of a seating surface of the head section, and a thickness of the surface layer portion of the screw thread of the first alloy section in the radial direction is 1/2000 or more and 1/10 or less of a maximum outer diameter of the shaft section.

5. The fastening member according to claim 3, wherein the fastening member is a female screw with the screw thread formed on an inner surface of a hole formed in a center portion, the second alloy section is located on an outer peripheral side of the first alloy section, and a Thickness of the First Alloy Section in the Radial Direction is 1/2000 or more and 1/10 or less of a maximum outer diameter of the female screw.

6. The fastening member according to claim 1, wherein the fastening member is a rivet including:
- a cylindrical shaft section;
- a head section provided at one end portion of the shaft section in the axial direction; and
- a neck section demarcating a boundary between the shaft section and the head section, the first alloy section constitutes at least a surface layer portion of the shaft section, a surface of the neck section and a surface layer portion of a seating surface of the head section, and a thickness of the first alloy section in the radial direction of the shaft section is 1/2000 or more and 1/10 or less of an outer diameter of the shaft section.

7. A rod-shaped member for a fastening member, comprising:
- a core section having a cylindrical shape and made of an aluminum alloy containing magnesium in an amount of greater than 0.2 wt % and 2.3 wt % or less and copper containing in an amount of greater than 1.0 wt % and 8.0 wt % or less; and
- an outer peripheral portion having a hollow cylindrical shape covering a side surface of the core section with no gap, and made of an aluminum alloy containing zinc in an amount of 0.005 wt % or more and 6.5 wt % or less and containing magnesium in an amount of 0.6 wt % or more and 2.0 wt % or less.

8. The rod-shaped member for a fastening member according to claim 7, wherein a thickness of the outer peripheral portion in the radial direction is 1/2000 or more and 1/10 or less of a maximum outer diameter of the outer peripheral portion.

9. A rod-shaped member for a fastening member, comprising:
- a core section having a hollow cylindrical shape and made of an aluminum alloy containing zinc in an amount of 0.005 wt % or more and 6.5 wt % or less and containing magnesium in an amount of 0.6 wt % or more and 2.0 wt % or less; and
- an outer peripheral portion having a hollow cylindrical shape covering a side surface of the core section with no gap, and made of an aluminum alloy containing magnesium in an amount of greater than 0.2 wt % and 2.3 wt % or less and containing copper in an amount of greater than 1.0 wt % and 8.0 wt % or less.

10. The rod-shaped member for a fastening member according to claim 9, wherein a thickness of the core section in the radial direction is 1/2000 or more and 1/10 or less of a maximum outer diameter of the outer peripheral portion.

* * * * *